(12) United States Patent
Migas et al.

(10) Patent No.: US 11,718,056 B2
(45) Date of Patent: Aug. 8, 2023

(54) METHOD OF FORMING A CUT IN A POLYMERIC COMPONENT

(71) Applicant: Closure Systems International Inc., Memphis, TN (US)

(72) Inventors: Jeremiah Migas, Crawfordsville, IN (US); Jeremy Morin, Zionsville, IN (US); Aravind Murali, West Lafayette, IN (US)

(73) Assignee: Closure Systems International Inc., Indianapolis, IN (US)

( * ) Notice: Subject to any disclaimer, the term of this patent is extended or adjusted under 35 U.S.C. 154(b) by 527 days.

(21) Appl. No.: 16/889,276

(22) Filed: Jun. 1, 2020

(65) Prior Publication Data
US 2020/0384714 A1 Dec. 10, 2020

Related U.S. Application Data

(60) Provisional application No. 62/856,854, filed on Jun. 4, 2019.

(51) Int. Cl.
*B29D 99/00* (2010.01)
*B29C 69/00* (2006.01)
*B26D 3/16* (2006.01)
*B65D 41/34* (2006.01)

(52) U.S. Cl.
CPC ......... *B29D 99/0096* (2013.01); *B26D 3/164* (2013.01); *B29C 69/001* (2013.01); *B65D 41/3428* (2013.01); *B26F 2210/04* (2013.01)

(58) Field of Classification Search
CPC . B26D 3/164; B65D 41/3428; B26F 2210/04; B29C 69/001
See application file for complete search history.

(56) References Cited

U.S. PATENT DOCUMENTS

2017/0066164 A1* 3/2017 Luzzato ............ B65D 41/3423
2017/0362003 A1 12/2017 Maguire

FOREIGN PATENT DOCUMENTS

| EP | 0 228 618 A2 | 7/1987 |
| WO | WO 1995/024299 A1 | 9/1995 |
| WO | WO 1996/11856 A1 | 4/1996 |

OTHER PUBLICATIONS

Third Party Observation in International Application No. PCT/US2020/035595, mailed Sep. 13, 2021 (3 pages).
International Search Report and Written Opinion in International Application No. PCT/US2020/035595, dated Oct. 9, 2020 (8 pages).

* cited by examiner

*Primary Examiner* — Xiao S Zhao
*Assistant Examiner* — John J DeRusso
(74) *Attorney, Agent, or Firm* — Nixon Peabody LLP

(57) ABSTRACT

A method of forming a cut in a polymeric component includes providing a blade assembly including at least one blade, and a mandrel. The mandrel includes a rigid portion and a conformal support ring. The conformal support ring includes a material softer than the material forming the blade. A polymeric component is located between the mandrel and the at least one blade. The polymeric component is cut via the at least one blade. The at least one blade extends into the conformal support ring after the at least one blade has penetrated through the polymeric component.

16 Claims, 5 Drawing Sheets

METHOD OF FORMING A CUT IN A POLYMERIC COMPONENT

CROSS-REFERENCE TO RELATED APPLICATION

This application claims priority to and benefit of U.S. Provisional Patent Application No. 62/856,854, filed Jun. 4, 2019, which is hereby incorporated by reference herein in its entirety.

FIELD OF THE INVENTION

The present invention relates generally to a method of forming a cut (e.g., a slit) in a polymeric component. More specifically, the present invention relates to a method of forming a cut in a polymeric component such as a polymeric closure using a mandrel.

BACKGROUND OF THE INVENTION

Polymeric components have been used in many applications over the years. Some polymeric components need to have cuts (e.g., slits) formed therein. One non-limiting example of such a polymeric component is a polymeric closure. Polymeric closures often include a tamper-evident feature to indicate to a user that the closure may have been opened. Tamper-evident features may include frangible connections. These frangible connections are typically formed by a cutting process using one or more blades and a mandrel with gaps or spaces formed therein to receive the one or more blades. The blade is typically a single continuous blade or a single continuous blade containing notched interruptions. The mandrel uses a narrow gap formed therein to receive the blade during the cutting process. The upper and lower bounds of the gap in the mandrel assist in preventing or inhibiting wall deflection greater than the blade overlap distance. This can achieve stable results using thinner blades when the gap in the mandrel and the blade overlap into the gap are appropriately dimensioned.

A problem arises with this method when thicker blades (e.g., 1.0 mm) are needed to be stacked or inverted to achieve a multi-level cutting geometry. Under these situations, this method becomes very difficult and unpractical. This method is also more difficult when a vertical cut is needed because this requires reliable timing such that the vertical blade is aligned with the gap in the mandrel.

It would be desirable to provide efficient methods of forming a cut in a polymeric component that is adaptable under different cutting requirements.

SUMMARY

According to one method, a cut is formed in a polymeric component using a mandrel. A blade assembly is provided including at least one blade. A mandrel is provided and includes a rigid portion and a conformal support ring. The conformal support ring comprises a material being softer than the material forming the at least one blade. The polymeric component is provided. The polymeric component is positioned between the mandrel and the at least one blade. The mandrel is moved towards the blade assembly, the blade assembly is moved towards the blade assembly, or the mandrel and the blade assembly are moved towards each other. The polymeric component is cut via the at least one blade. The at least one blade extends into the conformal support ring after the at least one blade has penetrated through the polymeric component.

According to another method, a polymeric closure is formed. A first closure portion and a second closure portion of the polymeric closure are molded. The first closure portion includes a polymeric top wall portion and a polymeric annular skirt portion depending from the polymeric top wall portion. The annular skirt portion includes an internal thread formation for mating engagement with an external thread formation of a container. The second closure portion includes a polymeric tamper-evident band. A portion of the annular skirt portion is cut to form a frangible connection that partially detachable connects the annular skirt portion and the tamper-evident band uses a blade assembly including at least one blade and a mandrel. The mandrel includes a rigid portion and a conformal support ring. The conformal support ring comprises a polymeric portion. The at least one blade extends into the conformal support ring after the at least one blade has penetrated through the polymeric component.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1:
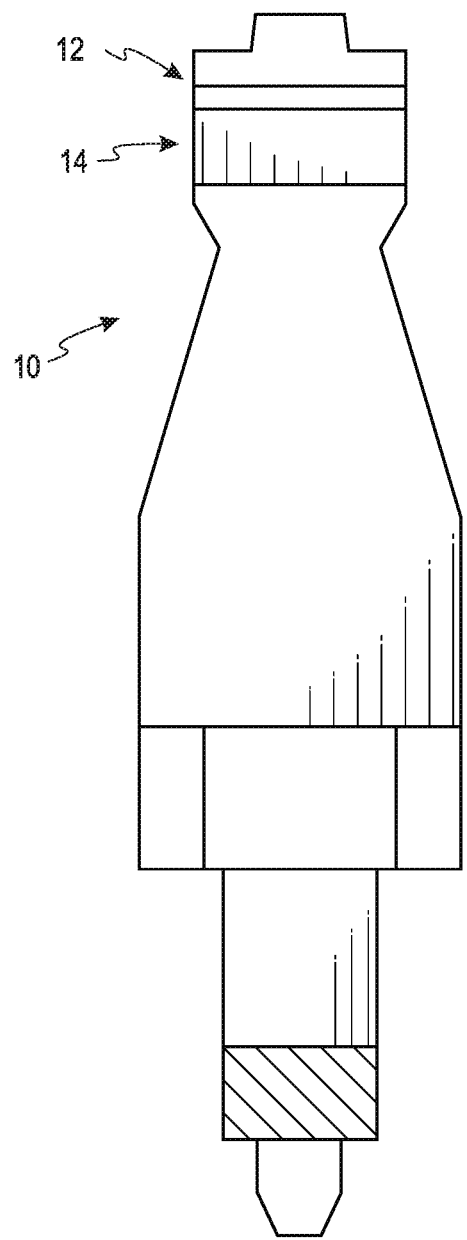
FIG. 1 is a front view of a mandrel that is used in one method of the present application.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

A method of forming a cut in a polymeric component includes providing a mandrel and a blade assembly including at least one blade. The mandrel includes a rigid portion and a conformal support ring. The conformal support ring comprises a material being softer than the material forming the at least one blade. A polymeric component is also provided. The polymeric component may be a polymeric closure according to one method. It is contemplated that the polymeric component may be other items such as a polymeric sheet, polymeric block or other polymeric objects.

The polymeric component is positioned between the mandrel and the at least one blade. In one method, the mandrel is moved towards the blade assembly. In another method, the blade assembly is moved towards the mandrel. In a further method, the mandrel and the blade assembly are moved towards each other. The polymeric component is cut via the at least one blade. The at least one blade is configured and positioned to extend into the conformal support ring after the at least one blade has penetrated through the polymeric component.

The methods of the present application are desirable in their ability to cut paths in multiple horizontal directions. The cut may be in the form a slit. The methods of the present application are especially desirable in their ability to cut paths in at least one horizontal direction and at least one vertical direction. In addition to horizontal and vertical direction cuts, it is contemplated that the cuts may be a diagonal cut or a spiral cut.

These cuts may be in the form of frangible connections in one embodiment. Some frangible connections include scoring or scored lines, notches, leaders, nicks or line of weaknesses. It is contemplated that the cuts do not form frangible connections in another embodiment. For example, there may be multiple cuts formed by the methods without any frangible connections.

The methods of the present application overcome the problems associated with providing support to the wall of the polymeric component, while achieving full depth cut penetration, while cutting over a wide area using multiple blades. The methods of the present application for cutting polymeric components provide an efficient, cost-effective solution.

Referring to FIG. 1, a mandrel 10 is shown according to one embodiment. The mandrel functions to provide support to a polymeric component during the cutting process. More specifically, the mandrel assists in (1) bracing a wall of the polymeric component (e.g., a sidewall or a skirt portion of a closure) and (2) preventing or inhibiting the wall from deflecting out of the blade path during the cutting process. Ultimately, the mandrel assists in producing a properly sized, shaped and located cut(s) in the polymeric component in conjunction with the blade assembly. The general exterior shape of the mandrel generally corresponds with the shape of the polymeric component. It is contemplated that the shape and size of the mandrel may be different than that shown in FIG. 1.

The mandrel 10 includes a rigid portion 12 and a conformal support ring 14. The rigid portion 12 of the mandrel 10 is typically metal. Non-limiting examples of metallic materials that may be used in forming the mandrel include aluminum, steel or the combination thereof. It is contemplated that other metallic materials may be used in forming the mandrel. It is contemplated that the mandrel may be non-metallic. One contemplated non-metallic material that may be used to form the mandrel is a fiber-filled polymeric material.

The conformal support ring 14 is sized and shaped to receive the at least one blade. The conformal support ring is designed to support an inner wall of the polymeric component to assist in preventing or inhibiting the wall from deflecting out of the blade path during the cutting process. By reducing or eliminating the any deflection, a full depth, repeatable cut can be more consistently obtained in the polymeric component. The mandrel, including the conformal support ring, has the ability to support the inner wall of the polymeric component to achieve full depth, repeatable cuts over a wide area with a plurality of blades. The blade(s) are typically in a horizontal orientation and/or a vertical orientation. It is contemplated that the blades may be in other orientations such as diagonal or spiral orientations.

It is contemplated that the conformal support ring may be formed or processed by different methods in the mandrel. For example, the conformal support ring may be cast in place or snapped into an opening or grove formed in the mandrel.

The conformal support ring 14 comprises a material being softer than the material forming the blade(s). It is desirable for the conformal support ring material to be formed from a non-metallic material. One especially desirable material for forming the conformal support ring is a polymeric material. Non-limiting examples of polymeric materials that may be used in forming the conformal support ring are urethanes (e.g., polyurethanes such as a thermoplastic polyurethane (TPU)), elastomers (e.g., thermoplastic elastomers), plastomers, rubber or rubber-like material (e.g., natural rubber, silicone rubber, neoprene rubber, nitrile rubber, butyl rubber, synthetic rubber) or combinations thereof.

One non-limiting commercial example for forming a conformal support ring is PRODWAYS' TPU-70A thermoplastic urethane. Another non-limiting commercial example for forming a conformal support ring is HEI-CAST'S and 8400N multi-component polyurethane system that can be obtained through ICOMOLD. It is contemplated that other polymeric materials may be used in forming the conformal support ring.

It is also contemplated that other non-polymeric materials may be used in forming the conformal support ring. Non-limiting examples of the same include softer metals (e.g., copper), and wood.

The conformal support ring is sized with respect to the blade(s). The sizes of the conformal support ring can be wide ranging and are dependent on the blade and the material properties of the conformal support ring. For example, a conformal support ring may be configured with a thermoplastic polyurethane (TPU) material of 70-A shore durometer having a thickness of about 1 mm with a 0.35 mm of blade overlap into the conformal support ring. In another example, a 50-A shore durometer TPU material having a ring thickness of 2 mm is used with a blade overlap of 0.15 mm.

The conformal support ring may be configured with materials with a hardness range from about 40 shore A to about 75 shore D. One example of such a material for forming a conformal support ring are cast urethanes.

The material forming the conformal support ring is generally flexible and tough. These material properties of the conformal support ring may be shown in various tests such as the hardness test, toughness test, and elongation at break XY (average of XY).

The material forming the conformal support ring generally has a hardness test as measured by Shore A of from about 30 to about 100 and, more specifically, from about 50 to about 90 and, even more specifically, from about 60 to about 80.

The material forming the conformal support ring generally has an elongation at break XY (average XY) as measured by ISO 527 of at least about 200% and, more specifically, at least about 350%. The material forming the conformal support ring generally has an elongation of break XY (average XY) as measured by ISO 527 of from about 250 to about 500%, and, more specifically, from about 300 to about 400%.

The material forming the conformal support ring generally has a low compressibility and a desirable cut resistance. The compressibility of the conformal support ring as measured by ASTM D575-91 is generally from about 5% to about 50% and, more specifically, from about 10% to about 40%, and even more specifically from about 10% to about 30%.

In the methods of the present application, a blade assembly includes at least one blade. The at least one blade assists in forming one or more cuts in the polymeric component. The cuts may be in the form of frangible connections. Some frangible connections include scoring or scored lines, notches, leaders, nicks or line of weaknesses. The cuts may be made without any frangible connections.

The blade may be a single continuous blade or a plurality of multiple individual blades. In another embodiment, a single continuous blade may be used with notched interruptions that act effectively as multiple blades. The blades are designed to provide full depth, repeatable cut penetration into the polymeric component.

In one method, the at least one blade includes a horizontal blade configured to cut the polymeric component in a general horizontal direction. In another method, the at least one blade includes a plurality of horizontal blades configured to cut the polymeric component in multiple general horizontal directions. The at least one blade also may be a vertical blade or a plurality of vertical blades that are configured to cut the polymeric component in a generally vertical direction. In other method, the least one blade may be a combination of one or more horizontal blades and one or more vertical blades. It is contemplated that the cuts may be formed in directions other than being generally in a horizontal or generally vertical direction. For example, other directions, for example, can be diagonal or spiral.

The thickness of the blades varies depending on the desired cuts to be formed. The blades typically have a thickness of from about 0.5 mm to about 2 mm and, more specifically, from about 0.5 mm to about 1.2 mm. The blades are typically made of a hardened material. One non-limiting example of a material forming the blade(s) is a hardened tool steel with hardness from 57 to 62 HRC such as A2. It is contemplated that other materials may be used in forming the blades.

Figure 2A:
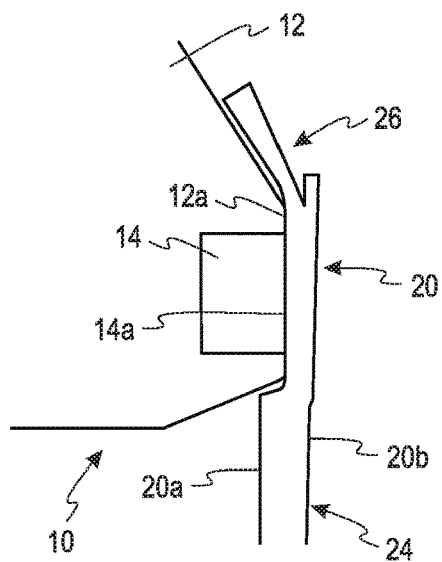
FIG. 2A is a side cross-sectional view of a mandrel and a polymeric closure used in one method before the blade penetration.
Figure 2B:
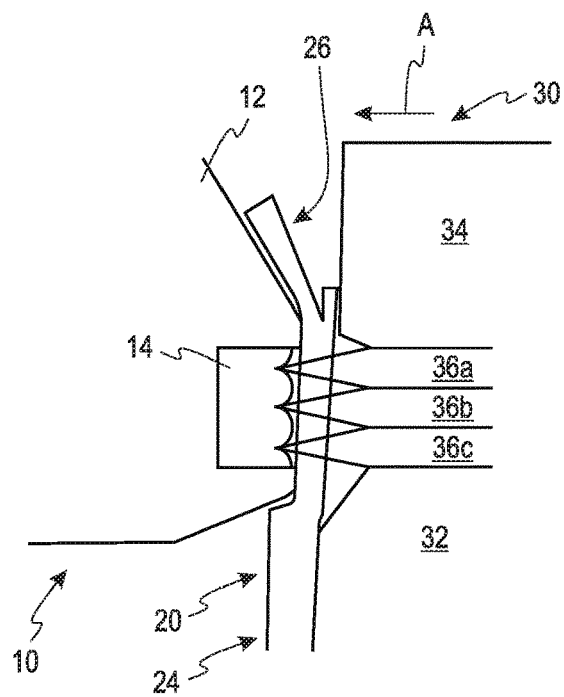
FIG. 2B is a side cross-sectional view of the mandrel and the polymeric closure of FIG. 2A after the blade penetration.

To perform cutting in the polymeric component, a blade assembly is typically moved with respect to the mandrel. This is shown in FIGS. 2A, 2B where a blade assembly 30 is moved with respect to a mandrel 10 in the direction of arrow A. It is contemplated that the mandrel may be moved with respect to the blade assembly in another method. In this method, the mandrel would move in an opposite direction to arrow A. It is also contemplated that the mandrel and the blade assembly may be moved with respect to each other.

Referring still to FIGS. 2A, 2B, the mandrel 10, the polymeric closure 20 and the blade assembly 30 are shown in cross-sectional views. FIG. 2A is a cross-sectional view before the blades have penetrated the polymeric closure, while FIG. 2B is a cross-sectional view after the blades have penetrated the polymeric closure. FIG. 2A shows the mandrel 10 including the rigid portion 12 and the conformal support ring 14, and the polymeric closure 20. The polymeric closure 20 is shown abutting the mandrel 10. The polymeric closure 20 is a polymeric closure that includes an inner surface 20a and an outer surface 20b. The inner surface 20a of the polymeric closure 20 abuts exterior surfaces 12a, 14a of the mandrel 10. The mandrel supports the polymeric closure during the cutting. The polymeric closure 20 includes a top wall portion (not shown in FIG. 2A), an annular polymeric skirt 24 and a tamper-evident band 26.

Referring to FIG. 2B, the mandrel 10, the polymeric closure 20 and the blade assembly 30 are shown during the cutting process. More specifically, FIG. 2B shows the mandrel 10, the polymeric closure 20 and the blade assembly 30 after the blades have penetrated the polymeric closure 20. The blade assembly 30 of FIG. 2B has moved in the direction of arrow A towards the mandrel 10.

The blade assembly 30 includes a first supporting section 32, a second supporting section 34, and three horizontal blades 36a-c. The horizontal blades 36a-c cut in a generally horizontal direction. The three horizontal blades 36a-c are shown as being connected to each other in FIG. 2B. During the cutting process, the first supporting section 32 supports the annular polymeric skirt 24 of the polymeric closure 20 and the second supporting section 34 supports the tamper-evident band 26 of the polymeric closure 20. The supporting sections 32, 34 of the blade assembly 30 work in combination with the mandrel 10 in supporting the walls of the polymeric closure 20.

Figure 2C:
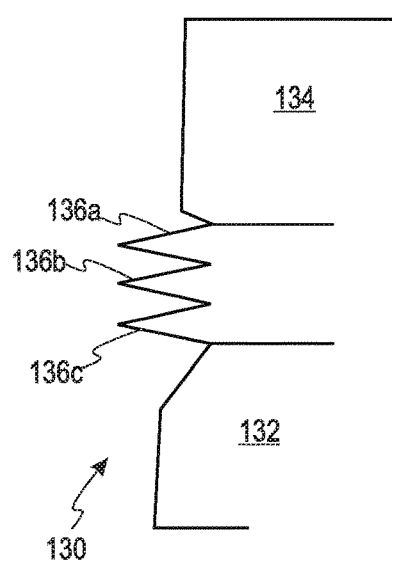
FIG. 2c is a side cross-sectional view of a blade assembly according to one embodiment.

It is contemplated that the blades may be a single continuous blade with two notched interruptions that form three individual points. This is shown, for example, in FIG. 2C with blade assembly 130 that includes a first supporting section 132, a second supporting section 134 and a plurality of individual blade points 136a-c. Such an embodiment would function in a similar manner as the three individual blades 36a-c of FIG. 2B.

Figure 3A:
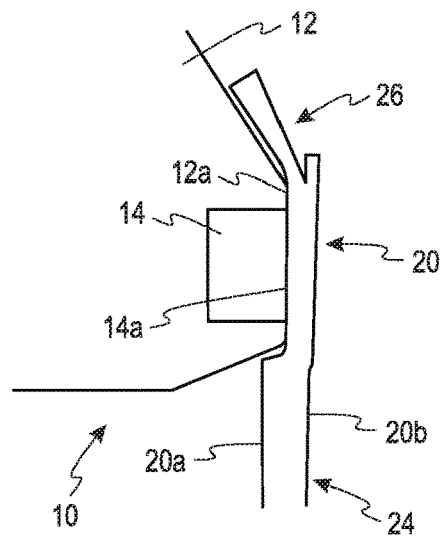
FIG. 3A is a side cross-sectional view of a mandrel and a polymeric closure used in one method before the blade penetration.
Figure 3B:
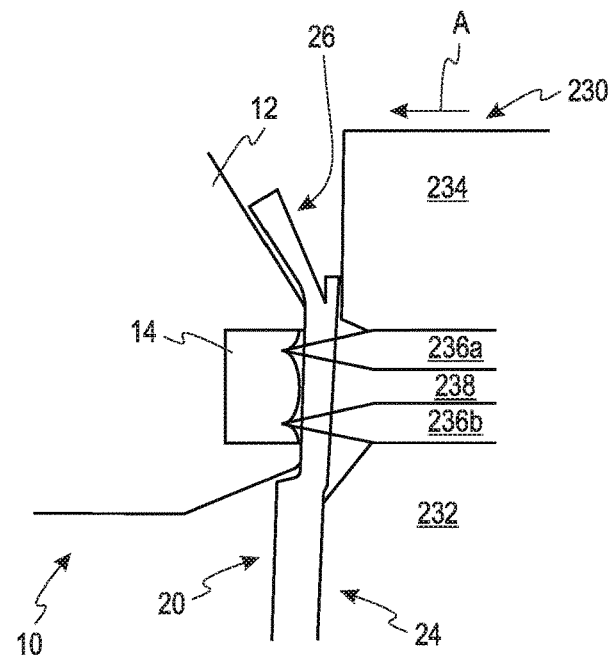
FIG. 3B is a side cross-sectional view of the mandrel and the polymeric closure of FIG. 3A after the blade penetration.

Referring to FIGS. 3A, 3B, a different blade assembly is shown. FIGS. 3A, 3B disclose the mandrel 10, the polymeric closure 20 and a blade assembly 230. The blade assembly 230 includes a first supporting section 232, a second supporting section 234, and a plurality of individual blades 236a, 236b and 238. Blades 236a, 236b cut in the generally horizontal direction, while blade 238 cuts in the generally vertical direction.

Figure 4A:
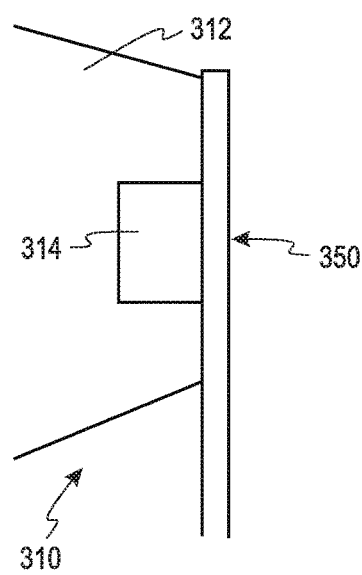
FIG. 4A is a side cross-sectional view of a mandrel and a polymeric component used in one method before the blade penetration.
Figure 4B:
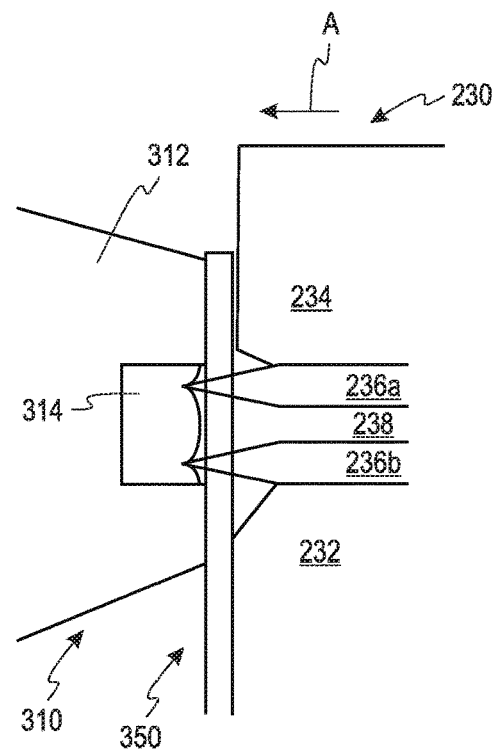
FIG. 4B is a side cross-sectional view of the mandrel and the polymeric component of FIG. 4A after the blade penetration.

FIGS. 4A, 4B disclose a mandrel 310, a polymeric component 350 and the blade assembly 230. The mandrel 310 of FIGS. 4A, 4B shows a rigid portion 312 and a conformal support ring 314. The polymeric component is a generally straight component. It is contemplated that the polymeric component may be sized or shaped differently. The shape of the mandrel corresponds to the shape of the polymeric component.

Figure 5A:
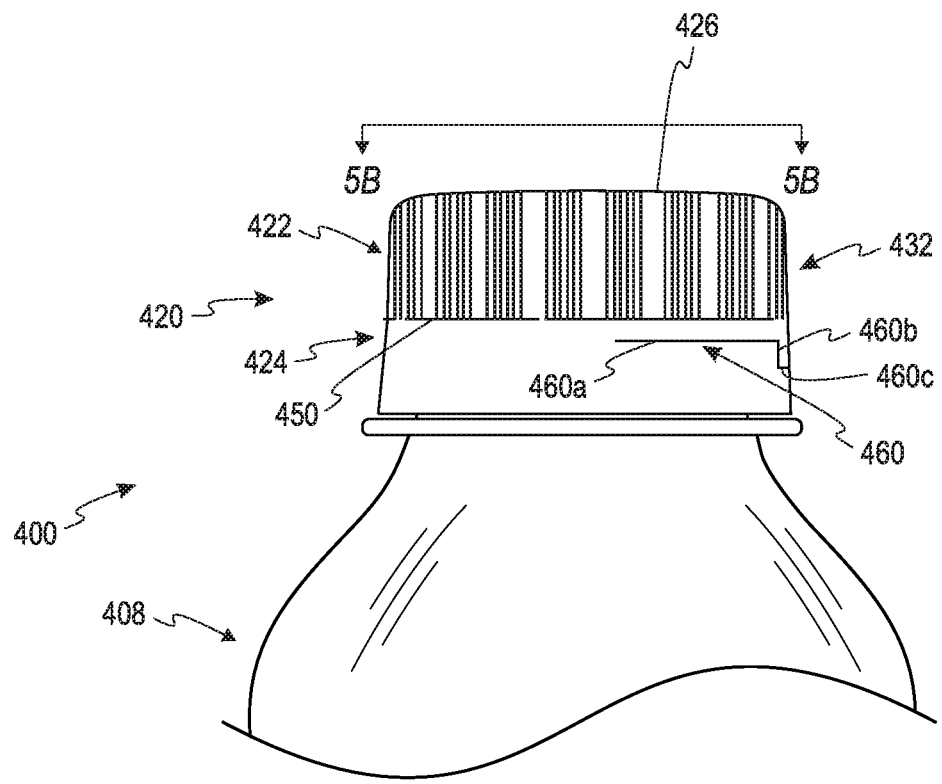
FIG. 5A is a side view of a package including a closure and a container.
Figure 5B:
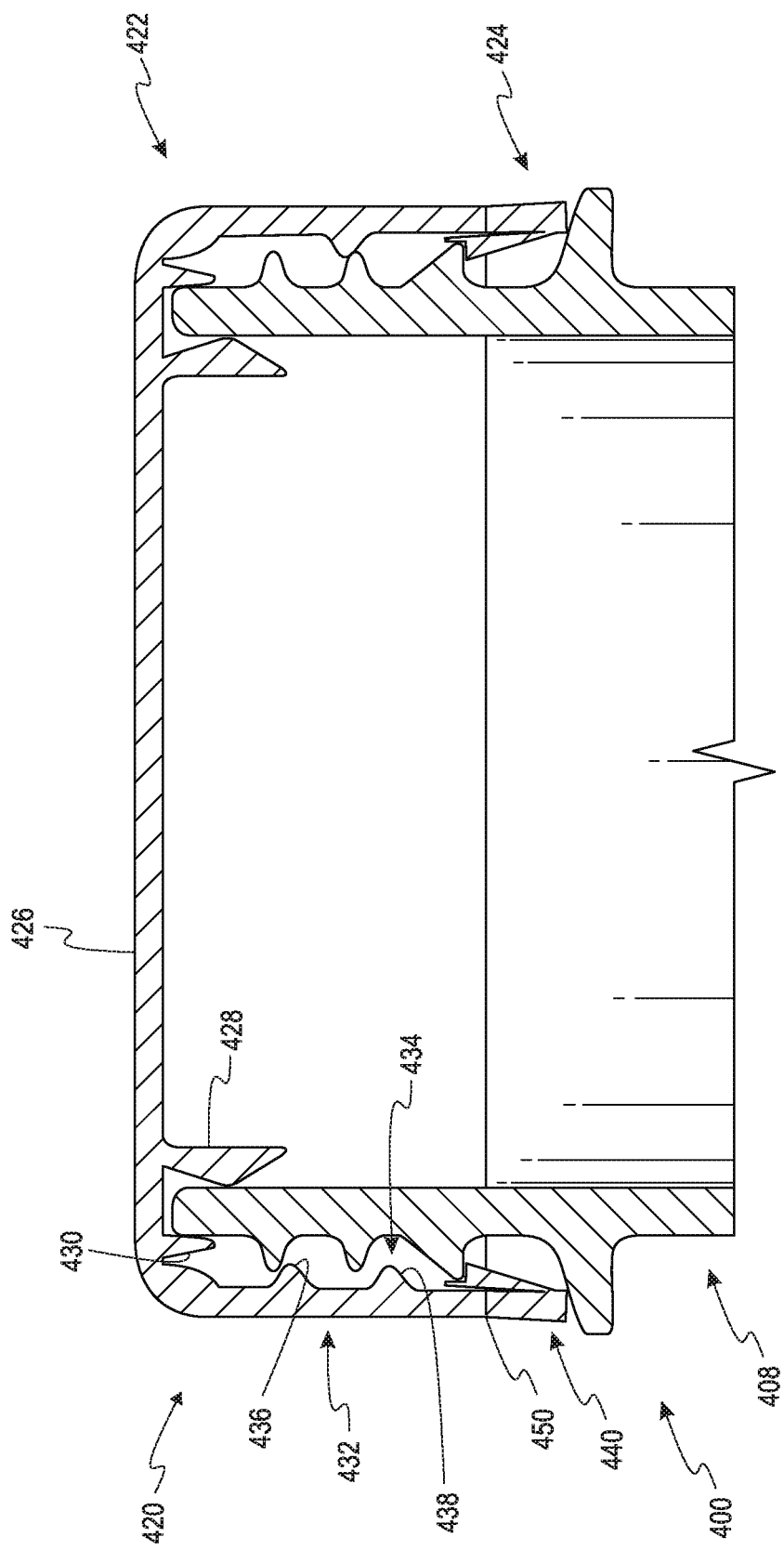
FIG. 5B is a cross-sectional view taken generally along line 5B-5B in FIG. 5A.

FIGS. 5A, 5B illustrate a package 400 that includes a container 408 and a polymeric closure 420. FIG. 5A depicts the closure 420 and the container 408 in an unopened position. The polymeric closure 420 is one non-limiting example of a polymeric component that may be formed using the methods of the present invention. The closures are configured to be placed on a container or bottle that contain product. The product is typically a liquid product, but also may be a solid product or a combination of a liquid and solid product. The polymeric closure 420 is a one-piece closure assembly. It is contemplated that a two-piece closure assembly may be formed using the methods of the present invention. The polymeric closure 420 is generally cylindrically shaped.

The polymeric closure 420 includes a first closure portion or lid 422 and a second closure portion or base 424. The first closure portion 422 includes a polymeric top wall portion 426 and a polymeric annular skirt portion 432. As shown in FIG. 5B, the second closure portion 424 includes a polymeric tamper-evident band 440. The polymeric tamper-evident band 440 depends from and is partially detachably connected to the polymeric annular skirt portion 432 by a first frangible connection 450.

Referring still to FIG. 5B, a cross-sectional view of a portion of the package 400 is shown. The first closure portion 422 further includes a polymeric continuous plug seal 428 and an outer seal 430.

The polymeric annular skirt portion 432 includes an internal thread formation 434 for mating engagement with an external thread formation of a container. The internal thread formation 434 includes a first closure lead 436 and a second closure lead 438. The first and second closure leads may be continuous or discontinuous. The internal thread formation of the closure may be a helical thread formation or other thread formations.

The polymeric closure 420 of FIG. 5A includes the first frangible connection 450 and a second frangible connection 460. The frangible connection 450 is in a generally horizontal direction, while the second frangible connection 460 has horizontal portions 460a, 460c and a vertical direction portion 460b.

The closure 420 is made of polymeric material and is typically made of an olefin (e.g., polyethylene (PE), polypropylene (PP)), polyethylene terephthalate (PET) or blends thereof. One example of a polyethylene that may be used in high density polyethylene (HDPE). It is contemplated that the top wall portion and the annular skirt portion may be made of other polymeric materials.

The closures are typically formed by processes such as injection or compression molding, extrusion or the combination thereof.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of forming a polymeric closure, the method comprising:
   molding a first closure portion and a second closure portion of the polymeric closure, the first closure portion including a polymeric top wall portion and a polymeric annular skirt portion depending from the polymeric top wall portion, the annular skirt portion including an internal thread formation for mating engagement with an external thread formation of a container, the second closure portion including a polymeric tamper-evident band; and
   cutting a portion of the annular skirt portion to form a frangible connection that partially detachably connects the annular skirt portion and the tamper-evident band using a mandrel and a blade assembly including at least one blade, the mandrel including a rigid portion and a conformal support ring, the conformal support ring comprising a polymeric portion, the at least one blade extending into the conformal support ring after the at least one blade has penetrated through the polymeric closure.

2. The method of claim 1, wherein the molding is injection molding.

3. The method of claim 1, wherein the at least one blade includes a plurality of blades configured to cut the polymeric closure in a generally horizontal direction and a vertical direction.

4. The method of claim 1, wherein the conformal ring comprises a urethane, an elastomer, a plastomer, rubber material, or combinations thereof.

5. The method of claim 1, wherein the rigid portion of the mandrel is a metallic portion.

6. The method of claim 5, wherein the metallic portion comprises aluminum, steel or a combination thereof.

7. The method of claim 1, wherein the conformal support ring has an elongation at break XY (average XY) as measured by ISO 527 of at least about 200%.

8. The method of claim 1, wherein the conformal support ring has an elongation at break XY (average XY) as measured by ISO 527 of from 250 to about 500%.

9. The method of claim 8, wherein the conformal support ring has an elongation at break XY (average XY) as measured by ISO 527 of from 300 to about 400%.

10. The method of claim 1, wherein the at least one blade includes a plurality of blades configured to cut the polymeric closure in a generally horizontal direction.

11. The method of claim 1, wherein the at least one blade includes at least one blade configured to cut the polymeric closure in a generally vertical direction.

12. The method of claim 1, wherein before the cutting, the mandrel is moved towards the blade assembly.

13. The method of claim 1, wherein before the cutting, the blade assembly is moved towards the mandrel.

14. The method of claim 1, wherein before the cutting, the mandrel and the blade assembly are moved towards each other.

15. The method of claim 1, wherein the conformal support ring has a hardness test measured by Shore A of from about 30 to about 100.

16. The method of claim 15, wherein the conformal support ring has a hardness test measured by Shore A of from about 50 to about 90.

* * * * *